(12) United States Patent
Miyazaki et al.

(10) Patent No.: US 8,791,903 B2
(45) Date of Patent: Jul. 29, 2014

(54) POINTING DEVICE

(75) Inventors: Naoyuki Miyazaki, Nagano (JP); Takashi Kashino, Nagano (JP); Naoki Yamaguchi, Nagano (JP)

(73) Assignee: Minebea Co., Ltd., Nagano (JP)

( * ) Notice: Subject to any disclaimer, the term of this patent is extended or adjusted under 35 U.S.C. 154(b) by 821 days.

(21) Appl. No.: 13/005,960

(22) Filed: Jan. 13, 2011

(65) Prior Publication Data

US 2011/0175808 A1 Jul. 21, 2011

(30) Foreign Application Priority Data

Jan. 18, 2010 (JP) ................................ 2010-008594

(51) Int. Cl.
*G06F 3/033* (2013.01)

(52) U.S. Cl.
USPC ........... 345/157; 345/158; 345/161; 345/163; 345/164; 345/167

(58) Field of Classification Search
CPC ............................... G06F 3/033; G06F 3/0383
USPC .......... 345/156–167, 204–212; 324/409, 662, 324/691; 600/546; 341/20; 715/856
See application file for complete search history.

(56) References Cited

U.S. PATENT DOCUMENTS

| | | | |
|---|---|---|---|
| 4,736,191 A * | 4/1988 | Matzke et al. ................... | 341/20 |
| 6,631,303 B1 * | 10/2003 | de Leon et al. .................. | 700/85 |
| 6,894,678 B2 * | 5/2005 | Rosenberg et al. ........... | 345/157 |
| 7,064,561 B2 * | 6/2006 | Morimoto ....................... | 324/691 |
| 7,131,073 B2 * | 10/2006 | Rosenberg et al. ........... | 715/856 |
| 2003/0218598 A1 | 11/2003 | Shibata | |
| 2004/0056669 A1 * | 3/2004 | Morimoto ....................... | 324/691 |
| 2005/0052426 A1 * | 3/2005 | Hagermoser et al. ......... | 345/173 |
| 2007/0273643 A1 * | 11/2007 | Erez et al. ....................... | 345/156 |
| 2009/0005700 A1 * | 1/2009 | Joshi et al. ...................... | 600/546 |
| 2009/0027351 A1 * | 1/2009 | Zhang et al. ................... | 345/173 |

FOREIGN PATENT DOCUMENTS

| | | |
|---|---|---|
| JP | 61-201320 A | 9/1986 |
| JP | 08-212009 A | 8/1996 |
| JP | 10-021001 A | 1/1998 |
| JP | 2003-296016 A | 10/2003 |
| JP | 2005-063301 A | 3/2005 |

* cited by examiner

*Primary Examiner* — Prabodh M Dharia

(74) *Attorney, Agent, or Firm* — Carrier Blackman & Associates, P.C.; Joseph P. Carrier; Michael J. McCandlish

(57) ABSTRACT

A pointing device is provided. The pointing device is configured to output a movement instruction signal for moving a cursor on a display in an instructed direction and includes: a pointing stick; a cursor movement including a +X sensor, −X sensor, +Y sensor and −Y sensor configured to sense a cursor movement instruction signal for instructing the cursor to move in +X direction, −X direction, +Y direction and −Y direction, respectively, according to an operation to the pointing stick; and a stick Z direction operation detector configured to determine that an instruction signal according to an operation to the pointing stick is different from the cursor movement instruction signals when each of outputs from the +X sensor, −X sensor, +Y and −Y sensor is changed by a corresponding predetermined first threshold value or greater within a predetermined time period.

9 Claims, 3 Drawing Sheets

POINTING DEVICE

BACKGROUND OF THE INVENTION

1. Field of the Invention

The present invention relates to a pointing device for controlling the movement of a cursor on a display of a personal computer and the like.

2. Description of the Related Art

Recently, as a notebook computer (notebook PC) is widely spread, a pointing device including a pointing stick is widely used to control the movement of a cursor on a display of the computer (for example, JP-A-2003-296016).

Since a notebook PC having this pointing device does not require a mouse to move a cursor on the display, this PC is consider not to occupy a space on a desk, so that task space can be reduced, and to have excellent usability at home or office as well as in use during moving by public transportation such as airplanes or trains.

This kind of pointing device is not only applied to a notebook PC, but also used to control the movement of a cursor on a display of a home gaming machine and the like.

A pointing device has configuration in which four displacement sensors configured by strain gauges and the like are arranged on a flexible support plate supporting a pointing stick (hereinafter, referred to simply as "stick") of the pointing device to constitute a Wheatstone bridge circuit (hereinafter, referred to as "bridge circuit" or "bridge connection").

Hereinafter, the configuration of a pointing device of a bridge connection configuration will be described in detain with reference to FIG. 3. A pointing device 5 having a bridge circuit shown in FIG. 3 includes a pointing stick (not shown) and a support plate (not shown) supporting the pointing stick. Four strain gauges 55-1, 55-2, 56-1 and 56-2 having resistance values varying according to the motion of the pointing stick are provided in a bridge shape. The output from the four strain gauges 55 and 56 is processed in a microcomputer 51 in the pointing device, is sent from the pointing device 5 to a notebook PC 20 by PS/2 communication, and causes to move a cursor on a display 21 of the notebook PC 20. That is, the operation of the pointing stick causes the cursor of the display 21 of the notebook PC 20 to move in X direction and Y direction, or an oblique direction thereto.

More specifically, the strain gauges 55 and 56 constituting the bridge circuit are provided so as to move the cursor displayed on the display 21 in X direction and Y direction of the display 21.

An output between the strain gauge 55-1 corresponding to a cursor +X direction and the strain gauge 55-2 corresponding to a cursor −X direction is input to the microcomputer 51 of the pointing device as a cursor movement instruction signal of the X direction. An output between the strain gauge 56-1 corresponding to a cursor +Y direction and the strain gauge 56-2 corresponding to a cursor −Y direction is input to the microcomputer 51 as a cursor movement instruction signal of the Y direction of the cursor on the display.

One side of the bridge circuit is connected to the ground GND, and the other side is connected to a power source of about 5 V through a fixed resistor 57. Also, an output between the fixed resistor 57 and the bridge circuit is input to the microcomputer 11 as an instruction signal of the Z direction of the pointing stick.

Thus, in the output of the four sensors of the pointing device having the bridge connection configuration as described above, the output corresponding to the cursor Z direction is directly sent from between the bridge circuit and the fixed resistor 57 to the microcomputer 51, in addition to the output according to the operation of the pointing stick corresponding to the X direction movement instruction of the cursor and the output corresponding to the Y direction movement instruction of the cursor.

Since the cursor Z direction instruction signal is easily (directly) received in the microcomputer 51, the pointing device that sends an operation instruction of the Z direction to the notebook PC as an output signal usually has a bridge connection configuration.

In the meantime, a pointing device having a so-called star connection configuration, in which four strain gauges are provided in parallel is not generally used since it is difficult to sense a stick operation of the Z direction.

SUMMARY OF THE INVENTION

An object of the present invention is to provide a pointing device having a star connection configuration which can detect a motion of a stick corresponding to a cursor movement instruction in an X direction and a Y direction that are orthogonal to each other on a display of a computer (PC) as well as immediately detect a stick operation corresponding to a stick Z direction input instruction of the pointing device in distinction from an instruction signal according to the cursor movement instruction.

According to an illustrative embodiment of the present invention, there is provided a pointing device configured to output a movement instruction signal for moving a cursor on a display in an instructed direction, with reference to an X direction and a Y direction orthogonally intersecting with each other at an original point on the display. The pointing device includes:

a pointing stick;

a cursor movement instruction sensor provided for the X direction and Y direction on the display, and including:

a cursor X positive direction movement instruction sensor configured to sense a cursor movement instruction signal for instructing the cursor to move away from the original point in +X direction according to an operation to the pointing stick;

a cursor X negative direction movement instruction sensor configured to sense a cursor movement instruction signal for instructing the cursor to move away from the original point in −X direction according to an operation to the pointing stick;

a cursor Y positive direction movement instruction sensor configured to sense a cursor movement instruction signal for instructing the cursor to move away from the original point in +Y direction according to an operation to the pointing stick; and a cursor Y negative direction movement instruction sensor configured to sense a cursor movement instruction signal for instructing the cursor to move away from the original point in −Y direction according to an operation to the pointing stick; and a stick Z direction operation detector configured to determine that an instruction signal according to an operation to the pointing stick is different from the cursor movement instruction signals when each of outputs from the cursor X positive direction movement instruction sensor, the cursor X negative direction movement instruction sensor, the cursor Y positive direction movement instruction sensor, and the cursor Y negative direction movement instruction sensor is changed by a corresponding predetermined first threshold value or greater within a predetermined time period.

According to the above configuration, a stick operation corresponding to a stick Z direction input instruction of the pointing device can be detected in distinction from the instruction signal according to a cursor movement instruction as well as a motion of a stick corresponding to a cursor movement instruction of the X direction and Y direction that intersects each other on a display of a computer (PC), by determining that the instruction signal by the stick operation of the pointing device is different from the cursor movement instruction signal when each of the outputs of the cursor X positive direction movement instruction sensor, the cursor X negative direction movement instruction sensor, the cursor Y positive direction movement instruction sensor, and the cursor Y negative direction movement instruction sensor is changed by the predetermined first threshold value within the predetermined time period.

In the above pointing device, the stick Z direction operation detector may be configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period and when a sum of change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater.

According to the above configuration, it can be certainly detected that an operation different from the cursor movement is performed on the stick of the pointing device, by determining the instruction signal by the operation of the pointing stick is an operation instruction signal different from the cursor movement instruction signal, when the sum of change amounts of the outputs of the cursor X positive direction movement instruction sensor, the cursor X negative direction movement instruction sensor, the cursor Y positive direction movement instruction sensor, and the cursor Y negative direction movement instruction sensor within the predetermined time period is the predetermined second threshold value or greater. In addition, by ignoring a state where the stick is merely pushed or pulled by mistake, misrecognition of the stick operation based on occurrence of such a state can be prevented.

In the pointing device, the stick Z direction operation detector may be configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period, when the sum of the change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater, and when a difference between the change amounts of the outputs from the cursor X positive direction movement instruction sensor and the cursor X negative direction movement instruction sensor within the predetermined time period is a predetermined third threshold value or smaller and a difference between the change amounts from the cursor Y positive direction movement instruction sensor and the cursor Y negative direction movement instruction sensor within the predetermined time period is a predetermined third threshold value or smaller.

According to the above configuration, it can be certainly detected that an operation different from the cursor movement is performed on the stick of the pointing device, by determining the instruction signal by the operation of the pointing stick is an operation instruction signal different from the cursor movement instruction signal, when a difference between the change amounts of the outputs of the cursor X positive direction movement instruction sensor and the cursor X negative direction movement instruction sensor within the predetermined time period is a predetermined third threshold value or greater, and a difference between the change amounts of the outputs of the cursor Y positive direction movement instruction sensor and the cursor Y negative direction movement instruction sensor within the predetermined time period is a predetermined third threshold value or greater. In addition, by ignoring a state where the stick is merely touched to be oblique by mistake, misrecognition of the stick operation based on occurrence of such a state can be prevented.

In the above pointing device, the stick Z direction operation detector may be configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period, when the sum of the change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater, and when a number of successive times where a difference between the change amounts of the outputs from the cursor X positive direction movement instruction sensor and the cursor X negative direction movement instruction sensor within the predetermined time period is a predetermined third threshold value or smaller and a difference between the change amounts from the cursor Y positive direction movement instruction sensor and the cursor Y negative direction movement instruction sensor within the predetermined time period is a predetermined third threshold value or smaller reaches a predetermined number of times.

According to the above configuration, it can be more exactly detected that an operation different from the cursor movement is certainly performed on the stick of the pointing device. In addition, by ignoring a state where the stick is merely touched to be oblique by mistake, misrecognition of the operation based on occurrence of such a state can be prevented.

As described above, there is provided a pointing device which can detect a motion of a stick corresponding to a cursor movement instruction in an X direction and a Y direction that are orthogonal to each other on a display of a computer (PC) as well as immediately detect a stick operation corresponding to a stick Z direction input instruction of the pointing device in distinction from an instruction signal according to the cursor movement instruction.

DETAILED DESCRIPTION

Hereinafter, a pointing device according to an illustrative embodiment of the present invention will be described in detail with reference to the accompanying drawings.

Figure 1:
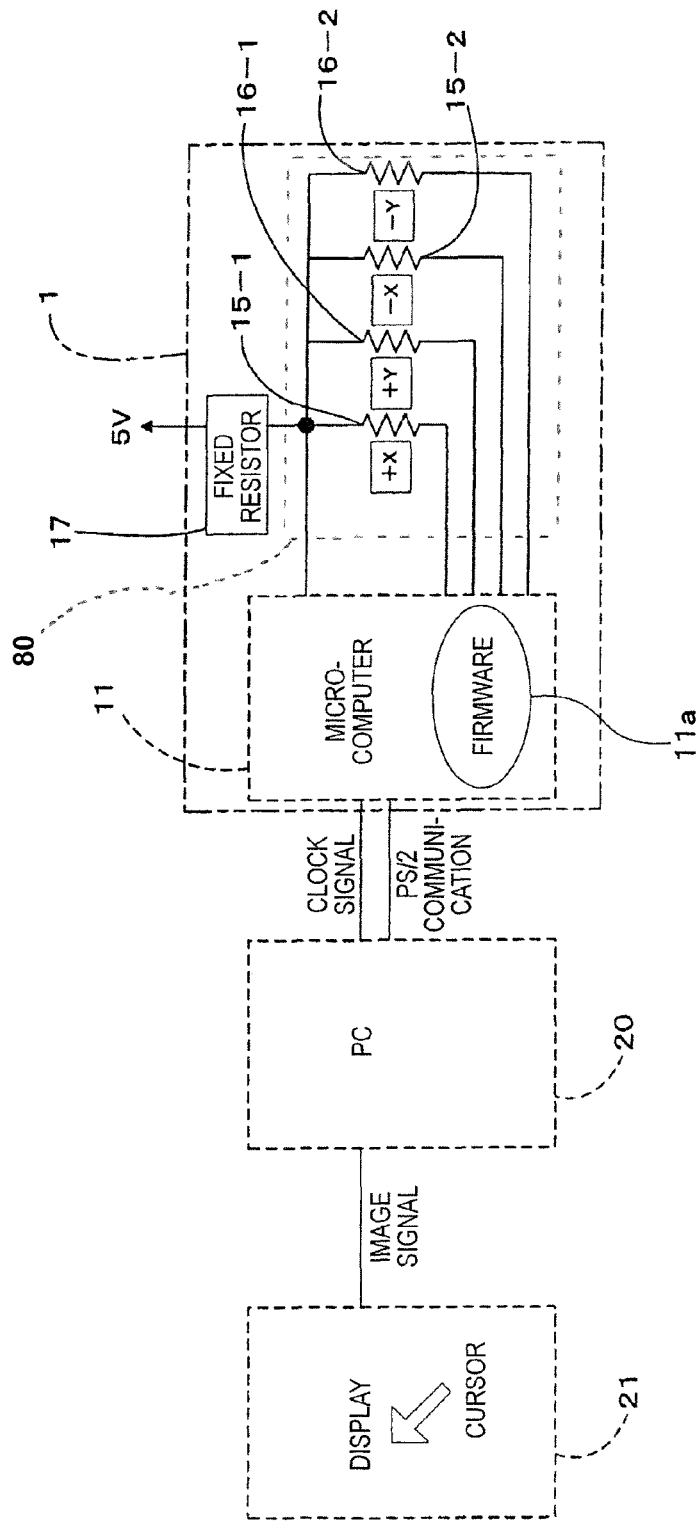
FIG. 1 is a block diagram illustrating a pointing device according to an illustrative embodiment, a PC including the pointing device, and a display.

A pointing device 1 according to an illustrative embodiment of the present invention is provided in a notebook computer (notebook PC) 20 include a display as shown in FIG. 1. The pointing device 1 is configured to perform positioning control of a cursor displayed on a display 21 of the notebook PC by a pointing stick (details not shown herein) of the notebook PC, and detection of a stick operation corresponding to a left click operation on a mouse.

The pointing device 1, which is a pointing device having a circuit of a star connection configuration as shown in FIG. 1, includes a pointing stick and a stick support plate (not shown) supporting the pointing stick. The pointing device 1 further includes a cursor movement instruction sensor 80 comprising four strain gauges 15, 16 (15-1, 15-2, 16-1 and 16-2). The four strain gauges 15, 16 (15-1, 15-2, 16-1 and 16-2) have resistance values varying according to the motion of the pointing stick and are provided in parallel on the flexible support plate to configure a star connection. The four strain gauges 15-1, 15-2, 16-1 and 16-2 detect the stick operation corresponding to the left click operation to the mouse, in addition to causing the cursor on the display 21 of the notebook PC 20 to move in a desired direction, by operating the pointing stick. The four strain gauges 15-1, 15-2, 16-1 and 16-2 are alternatively referred to herein as a cursor X positive direction movement instruction sensor 15-1, a cursor X negative direction movement instruction sensor 15-2, a cursor Y positive direction movement instruction sensor 16-1, and a cursor Y negative direction movement instruction sensor 16-2.

In the present illustrative embodiment, the pointing stick includes a schematic circuit configuration shown in FIG. 1, and includes four strain gauges 15, 16 (15-1, 15-2, 16-1 and 16-2) on the stick support plate having flexibility deformable according to the operation of the stick. The four strain gauges 15-1, 15-2, 16-1 and 16-2 are provided on the stick support plate in response to the operation direction of the stick in +X direction, −X direction, +Y direction, and −Y direction with respect to XY rectangular coordinate, respectively. One ends of the respective strain gauges 15-1, 15-2, 16-1 and 16-2 are connected to a power source of about 5V through a fixed resistor 17, respectively, and the other ends thereof are directly connected to the microcomputer 11 of the pointing device 1, respectively. Accordingly, the resistance values of the respective strain gauges 15-1, 15-2, 16-1 and 16-2 are measured in the microcomputer 11 to control the movement of the cursor according to the stick operation.

Specifically, the four strain gauges 15-1, 15-2, 16-1 and 16-2 include a cursor X positive direction movement instruction sensor 15-1, a cursor X negative direction movement instruction sensor 15-2, a cursor Y positive direction movement instruction sensor 16-1, and a cursor Y negative direction movement instruction sensor 16-2. The cursor X positive direction movement instruction sensor 15-1 senses a cursor movement instruction signal that instructs the cursor to move away from an original point in +X direction. The cursor X negative direction movement instruction sensor 15-2 senses a cursor movement instruction signal that instructs the cursor to move away from the original point in −X direction. The cursor Y positive direction movement instruction sensor 16-1 senses a cursor movement instruction signal that instructs the cursor to move away from the original point in +Y direction. The cursor Y negative direction movement instruction sensor 16-2 senses a cursor movement instruction signal that instructs the cursor to move away from the original point in −Y direction.

In the meantime, the detection of Z direction of the pointing device is performed by firmware 11a of the microcomputer in the present illustrative embodiment.

Figure 2:
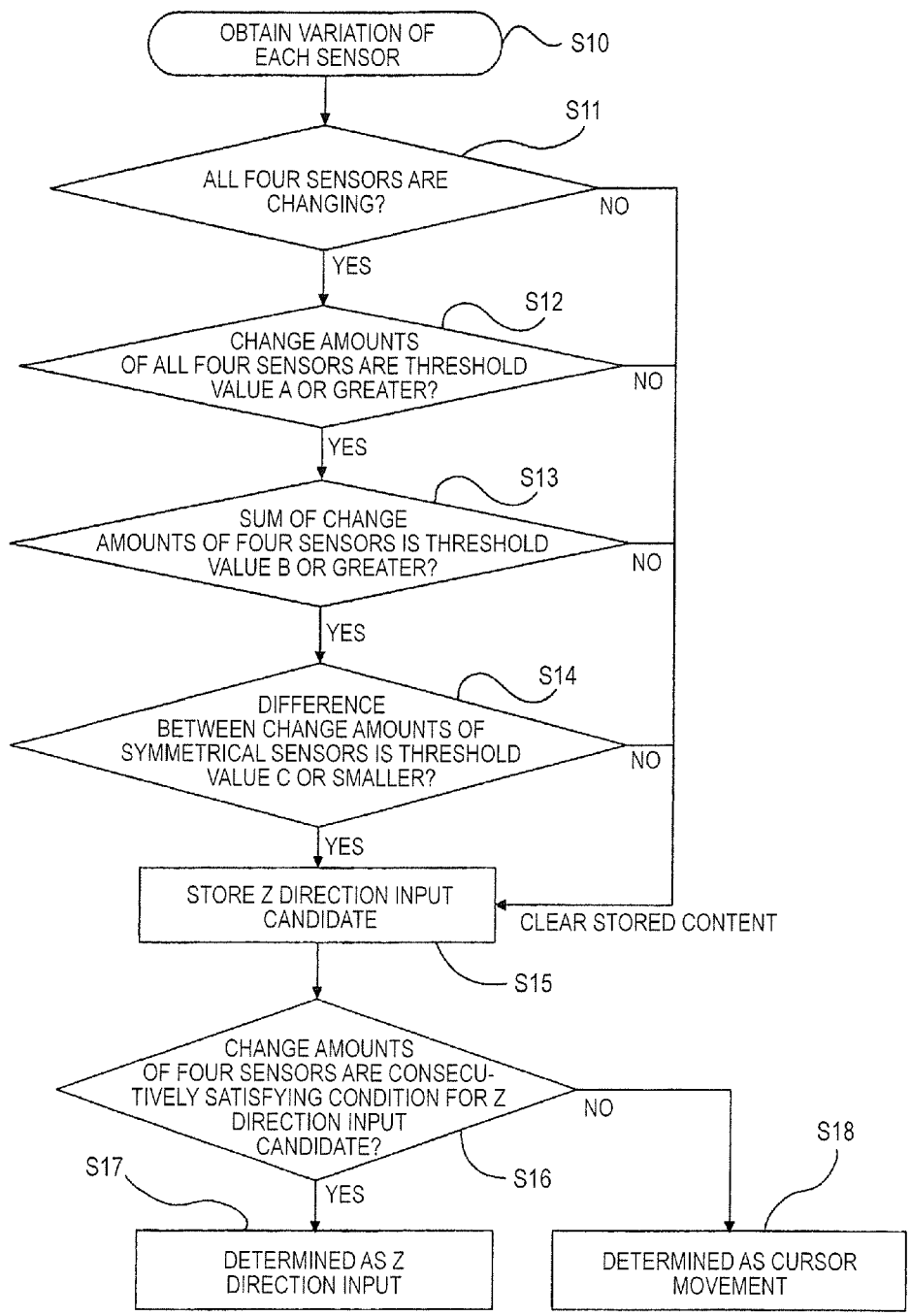
FIG. 2 is a flowchart illustrating a procedure of a stick Z direction operation detection performed by the pointing device of FIG. 1.
Figure 3:
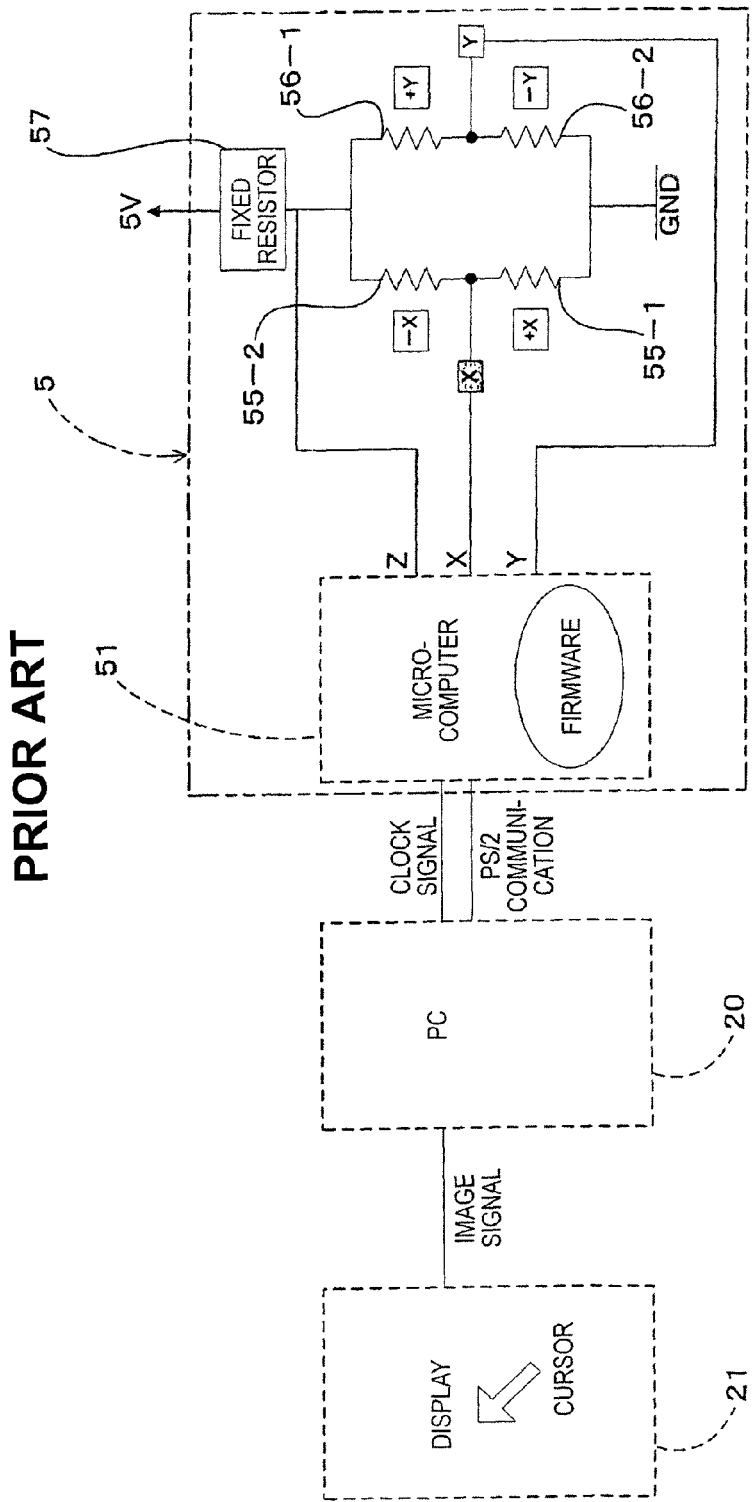
FIG. 3 is a block diagram illustrating a relate-art pointing device, a PC including the related-art pointing device, and a display.

Hereinafter, a procedure of detecting the stick Z direction of the pointing device 1 according to the illustrative embodiment of the present invention, that is, a procedure for detecting a stick operation of the pointing device 1 corresponding to the left click operation to the mouse will be described in detail with reference to the flowchart of FIG. 2.

First, in operation S10, a change amount of an output from each of four sensors is obtained. In this case, the output of each sensor is consecutively measured, for example, every 15 milliseconds. Specifically, when a cursor is caused to be moved by the pointing stick, the output of each sensor is measured by sampling the resistance values of four strain gauges 15 and 16 provided on the rectangular coordinate on the pointing stick support plate supporting a stick, respectively.

In operation S11, it is determined whether the outputs of the four sensors change or not, that is, whether all the output of the four sensors have changes representing a cursor movement instruction within a predetermined time period. Specifically, the change amounts of the outputs of the strain gauges 15 and 16, which are sampled in operation S11 are used.

When all the output of the four sensors change, it is determined in operation S12 whether the output of each of the four sensors is a predetermined first threshold value or greater (the first threshold value is referred to as a threshold value A in the following description and FIG. 2).

Specifically, it is determined whether the outputs of the cursor X positive direction movement instruction sensor 15-1, the cursor X negative direction movement instruction sensor 15-2, the cursor Y positive direction movement instruction sensor 16-1, and the cursor Y negative direction movement instruction sensor 16-2 changes by the predetermined threshold value A or greater within the predetermined time period, respectively. In this case, when it is determined that at least one of the four sensors does not changes by the predetermined threshold value A or greater, stored content (history of consecutively satisfying a condition in operation S15) in operation S15 described below is cleared.

On the other hand, when it is determined that all of change amounts of the outputs of the four sensors are the predetermined threshold value A or greater, it is determined whether the sum of the change amounts of the outputs of the four sensors is a predetermined second threshold value or greater (the second threshold value is referred to as a threshold value B in the following description and FIG. 2) in operation S13.

Specifically, it is determined whether the sum of change amounts of the outputs of the cursor X positive direction movement instruction sensor 15-1, the cursor X negative direction movement instruction sensor 15-2, the cursor Y positive direction movement instruction sensor 16-1, and the cursor Y negative direction movement instruction sensor 16-2 within the predetermined time period is the predetermined threshold value B or greater. In this case, when it is determined that the sum of change amounts of the outputs of the four sensors is smaller than the predetermined threshold value B, the stored content (history of consecutively satisfying a condition in operation S15) in operation S15 described below is cleared.

When it is determined that the sum of the change amounts of the outputs of the four sensors is the predetermined threshold value B or greater in operation S13, a difference between change amounts of sensors that are symmetrically provided is a third threshold value or smaller (the third threshold value is referred to as a threshold value C in the following description and FIG. 2) in operation S14.

Specifically, it is determined whether a difference between the change amounts of the outputs of the cursor X positive direction movement instruction sensor 15-1 and the cursor X negative direction movement instruction sensor 15-2 is the predetermined threshold value C or smaller, and whether a difference between the change amounts of the outputs of the cursor Y positive direction movement instruction sensor 16-1 and the cursor Y negative direction movement instruction sensor 16-2 is the predetermined threshold value C or smaller. In this case, when it is determined that the difference between the change amounts of the outputs of sensors that are symmetrically provided is the threshold value C or greater, the stored content (history of consecutively satisfying a condition in operation S15) in operation S15 described below is cleared.

When it is determined that the difference between the change amounts of the outputs of sensors that are symmetrically provided is the threshold value C or smaller in operation S14, that fact is stored as a Z direction input candidate in operation S15. Specifically, a consecutive number of times satisfying the condition of operation S15 is stored.

In operation S16, it is determined whether the change amounts of the outputs of the four sensors consecutively satisfy the condition for the Z direction input candidate. Specifically, it is determined whether the condition is consecutively satisfied a predetermined number of times (i.e., for a certain time), for example, two times to about 10 times in a sensor output sampling cycle. Here, when the change amounts of the outputs of the four sensors satisfy the condition for the Z direction input candidate consecutively (for a predetermined time period), the pointing device 1 determines that the pointing stick is instructed as a Z direction input in operation S17.

On the other hand, when it is determined that any one of the change amounts of the outputs of the four sensors does not consecutively satisfy the condition for the Z direction input candidate, it is determined as a cursor movement in operation S18.

As described above, although the pointing device according to the present illustrative embodiment has the star connection configuration, the pointing device 1 can detect a motion of a stick corresponding to a cursor movement instruction in the X direction and the Y direction that are orthogonal to each other on the display of the notebook PC as well as immediately detect a stick operation corresponding to the stick Z direction input instruction of the pointing device 1 in distinction from the instruction signal according to the cursor movement instruction, only by using the firmware 11a in the microcomputer 11 without providing a special hardware circuit (without having a complex configuration).

Also, by providing the determination operation S13, it can be prevented a misdetermination that the stick of the pointing device is operated to move the cursor and the pointing device can certainly cancel a misoperation of pushing or pulling the stick by mistake. Additionally, by providing the determination operation S14, a misoperation of making the stick oblique by mistake can be surely canceled.

The above-described effect can be achieved by the configuration including operations S12 and S13, that is, the configuration of determining that the instruction signal by the stick operation of the pointing device is an operation instruction signal different from the cursor movement instruction signal when the outputs of the cursor X positive direction movement instruction sensor, the cursor X negative direction movement instruction sensor, the cursor Y positive direction movement instruction sensor, and the cursor Y negative direction movement instruction sensor changes by the predetermined threshold value A or greater, respectively, and when the sum of the change amounts of the outputs of the cursor X positive direction movement instruction sensor, the cursor X negative direction movement instruction sensor, the cursor Y positive direction movement instruction sensor, and the cursor Y negative direction movement instruction sensor is the predetermined threshold value B or greater.

However, the configuration including the determination operation S14, that is, the configuration of determining that the instruction signal by the operation of the pointing stick is an operation instruction signal different from the cursor movement instruction signal when the difference between the change amounts of the outputs of the cursor X positive direction movement instruction sensor and the cursor X negative direction movement instruction sensor within the predetermined time period is the predetermined threshold value C or smaller and the difference between the change amounts of the outputs of the cursor Y positive direction movement instruction sensor and the cursor Y negative direction movement instruction sensor within the predetermined time period is the predetermined threshold value C or smaller may be more advantageous in that the misdetermination that the stick of the pointing device is operated to move the cursor can be surely prevented, and the misoperation of making the stick of the pointing device oblique by mistake can be surely canceled.

Also, the above-described effect can be achieved even though it is determined that the instruction signal by the stick operation of the pointing device is an operation instruction signal different from the cursor movement instruction signal on the ground that the output of the cursor X positive direction movement instruction sensor, the cursor X negative direction movement instruction sensor, the cursor Y positive direction movement instruction sensor, and the cursor Y negative direction movement instruction sensor changes by the predetermined threshold value A or greater within the predetermined time period.

However, the misoperation of pushing or pulling the stick of the pointing device by mistake may be cancelled by determining that the instruction signal by the stick operation of the pointing device is an operation instruction signal different from the cursor movement instruction signal when the sum of the change amounts of the output of the cursor X positive direction movement instruction sensor, the cursor X negative direction movement instruction sensor, the cursor Y positive direction movement instruction sensor, and the cursor Y negative direction movement instruction sensor is the predetermined threshold value B greater.

Further, the pointing device of the star connection configuration according to the illustrative embodiment switches the output of the cursor X positive direction movement instruction sensor 15-1, the cursor X negative direction movement instruction sensor 15-2, the cursor Y positive direction movement instruction sensor 16-1, and the cursor Y negative direction movement instruction sensor 16-2 at a high speed to input them into the microcomputer 11, respectively. Thus, the pointing device is configured to have a structure that need not always supply a current to the four sensors since the current needs to be supplied to a corresponding sensor only when the sensor is electrically connected by a switch.

In the meantime, since the output detection by switching of the four sensors is impossible to realize with the structure of a related-art pointing device of a bridge connection configuration, a necessity of always supplying a current to each sensor increases current consumption of a battery.

Accordingly, the pointing device controls a current consumption less than the related-art pointing device of the bridge connection configuration. Thus, there are additional effects in that the current supplying time (PC usage time per charge) of a battery of a notebook PC including the pointing device according to the illustrative embodiment can be lengthened, and the notebook PC including the pointing device according to the illustrative embodiment can be used longer than a notebook PC including of the pointing device of the related-art bridge connection configuration.

The pointing device according to the present invention is not limited to the pointing device having a pointing stick as described above as long as having the star connection configuration. That is, the inventive concept of the present invention is applicable to any type of pointing device that is used to control cursor movement on a display by detecting the movement of the a cursor in +X direction, −X direction, +Y direction, and −Y direction on the rectangular coordinate system using individual sensors.

Specifically, the pointing device is applicable to a pointing device that is used in a computer gaming machine including a joystick and having a function of detecting an instruction signal different from an instruction signal for moving a cursor or icon on a display when the joystick is pushed or pulled in a direction of its axial line.

Also, although the pointing device is applied to a notebook PC in the above illustrative embodiment, it is apparent that the pointing device can also be applied to a small-sized personal computer.

Further, while the first threshold value is defined as the threshold A in the above illustrative embodiment, the threshold value regarding the movement instruction signals of the cursor X and Y directions may be modified according to the specification of an actual design. Specifically, the scope of the present invention includes using a threshold value A1 for moving in the cursor X positive/negative direction, and using a threshold value A2 for moving in the cursor Y positive/negative direction. Also, the scope of the present invention includes slightly changing the first threshold value regarding the output of the four sensors including the cursor X positive direction movement instruction sensor, the cursor X negative direction movement instruction sensor, the cursor Y positive direction movement instruction sensor, and the cursor Y negative direction movement instruction sensor into A1, A2, A3 and A4, respectively.

Similarly, while the third threshold value is defined as the threshold value C in the above illustrative embodiment, the threshold value regarding the movement instruction signals of the cursor X and Y directions may be modified according to the specification of an actual design. Specifically, the scope of the present invention includes the configuration that when the difference between the change amounts of the outputs of the cursor X positive direction movement instruction sensor and the cursor X negative direction movement instruction sensor within a predetermined time period is a threshold value C1 or greater and the difference between the change amounts of the outputs of the cursor Y positive direction movement instruction sensor and the cursor Y negative direction movement instruction sensor within a predetermined time period is a threshold value C2 or greater, the condition related to the operation S14 is satisfied.

What is claimed is:

1. A pointing device configured to output a movement instruction signal for moving a cursor on a display in an instructed direction, with reference to an X direction and a Y direction orthogonally intersecting with each other at an original point on the display, the pointing device comprising:
   a pointing stick;
   a cursor movement instruction sensor provided for the X direction and Y direction on the display, and including:
      a cursor X positive direction movement instruction sensor configured to sense a cursor movement instruction signal for instructing the cursor to move away from the original point in +X direction according to an operation to the pointing stick;
      a cursor X negative direction movement instruction sensor configured to sense a cursor movement instruction signal for instructing the cursor to move away from the original point in −X direction according to an operation to the pointing stick;
      a cursor Y positive direction movement instruction sensor configured to sense a cursor movement instruction signal for instructing the cursor to move away from the original point in +Y direction according to an operation to the pointing stick; and
      a cursor Y negative direction movement instruction sensor configured to sense a cursor movement instruction signal for instructing the cursor to move away from the original point in −Y direction according to an operation to the pointing stick; and
   a stick Z direction operation detector configured to determine that an instruction signal according to an operation to the pointing stick is different from the cursor movement instruction signals when each of outputs from the cursor X positive direction movement instruction sensor, the cursor X negative direction movement instruction sensor, the cursor Y positive direction movement instruction sensor, and the cursor Y negative direction movement instruction sensor is changed by a corresponding predetermined first threshold value or greater within a predetermined time period.

2. The pointing device according to claim 1,
   wherein the stick Z direction operation detector is configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period and when a sum of change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater.

3. The pointing device according to claim 1, wherein the stick Z direction operation detector is configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period, when the sum of the change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater, and when a difference between the change amounts of the outputs from the cursor X positive direction movement instruction sensor and the cursor X negative direction movement instruction sensor within the predetermined time period is a predetermined third threshold value or smaller and a difference between the change amounts from the cursor Y positive direction movement instruction sensor and the cursor Y negative direction movement instruction sensor within the predetermined time period is a predetermined third threshold value or smaller.

4. The pointing device according to claim 1, wherein the stick Z direction operation detector is configured to determine that the instruction signal according to an operation to the pointing stick is different from the cursor movement instruction signals when each of the outputs from the cursor X positive direction movement instruction sensor, the cursor X negative direction movement instruction sensor, the cursor Y positive direction movement instruction sensor, and the cursor Y negative direction movement instruction sensor is changed by the corresponding predetermined first threshold value or greater within the predetermined time period, when the sum of the change amounts of the outputs from the cursor X positive direction movement instruction sensor, the cursor X negative direction movement instruction sensor, the cursor Y positive direction movement instruction sensor, and the cursor Y negative direction movement instruction sensor within the predetermined time period is a second predetermined threshold value or greater, and when a number of successive times where a difference between the change amounts of the outputs from the cursor X positive direction movement instruction sensor and the cursor X negative direction movement instruction sensor within the predetermined time period is a predetermined third threshold value or smaller and a difference between the change amounts from the cursor Y positive direction movement instruction sensor and the cursor Y negative direction movement instruction sensor within the predetermined time period is a predetermined third threshold value or smaller reaches a predetermined number of times.

5. The pointing device according to claim 1, wherein the change of outputs of each of the direction movement instruction sensors is determined while said sensors are being supplied with current, and the change of outputs of each of said sensors is due to a change of an intrinsic value of the respective sensor.

6. The pointing device according to claim 5, wherein the intrinsic value of the respective direction movement instruction sensor is a resistance value.

7. The pointing device according to claim 1, wherein the direction movement instruction sensors are arranged in a circuit having a star connection configuration.

8. The pointing device according to claim 7, wherein a value of each of the direction movement instruction sensors is measured individually and independently.

9. The pointing device according to claim 1, wherein a value of each of the direction movement instruction sensors is measured individually and independently.

* * * * *